Jan. 22, 1974   W. M. CHANDLER ET AL   3,787,545
BURIAL VAULTS

Original Filed April 1, 1968   8 Sheets-Sheet 4

INVENTORS
WESLEY M. CHANDLER
PAUL F. HEUSER
BERNARD T. JUBA
BY Charles B. Cannon
Their Atty Jan. 22, 1974 W. M. CHANDLER ET AL 3,787,545
BURIAL VAULTS

Original Filed April 1, 1968 8 Sheets-Sheet 6

INVENTORS
WESLEY M. CHANDLER
PAUL F. HEUSER
BERNARD T. JUBA
BY Charles B. Cannon
Their Atty INVENTORS.
WESLEY M. CHANDLER
PAUL F. HEUSER
BERNARD T. JUBA
BY Charles B. Cannon
Their Atty

United States Patent Office 3,787,545
Patented Jan. 22, 1974

3,787,545
BURIAL VAULTS
Wesley M. Chandler and Paul F. Heuser, St. Paul, and Bernard T. Juba, White Bear Lakes, Minn., assignors to Wilbert, Inc., Broadview, Ill.
Division of application Ser. No. 717,517, Apr. 1, 1968, now Patent No. 3,439,461, and a continuation-in-part of application Ser. No. 513,397, Dec. 13, 1965. This application Oct. 25, 1968, Ser. No. 798,825
Int. Cl. B32b 31/12
U.S. Cl. 264—135
1 Claim

ABSTRACT OF THE DISCLOSURE

A method for making a composite burial vault comprising an open-topped box like structure and cover therefore wherein preformed liners for each of the box like structure and core are each coated with a wet, tacky adhesive such as epoxy resin. While the epoxy resin is maintained in a wet, tacky state a damp concrete mix is applied directly on the wet, tacky adhesive coating with the adhesive coating and the concrete component intermingled at their contacting adjacent surfaces and curing in situ the concrete component and the adhesive coating on each of the box-like structure and cover.

---

This application is a division of applicant's application, Ser. No. 717,517, filed Apr. 1, 1968, and is a continuation-in-part of applicants' application, Ser. No. 513,397, filed Dec. 13, 1965, said application, Ser. No. 717,517, filed Apr. 1, 1968 matured into Pat. No. 3,439,461, issued Apr. 22, 1969.

Burial valuts of various constructions have been made and used heretofore and among these have been burial valults made entirely of concrete; burial valuts made of a single wall of reinforced concrete having an asphalt inner liner; burial valults made of a double wall of reinforced concrete having an inner asphalt liner between the two concrete walls; burial vaults made of various molded plastic resinous materials; burial valuts embodying a concrete outer wall having an inner liner of glass fiber reinforced resin; and burial vaults made of various other materials.

All of such prior burial vaults have had certain desirable features and advantages and, in some instances, certain undesirable features and disadvantages. Thus, for example, burial valuts made entirely of reinforced concrete, when properly made and of proper wall thickness, etc., have adequate structural and tensile strength to resist the crushing force of the overlying earth load and the hydrostatic pressure to which the vault is subjected when it is interred in a grave opening, as well as when it is subjected to the additional pressure of earth handling machinery moved thereover, as is common practice in cemetary operations. However, such prior vaults made of reinforced concrete are heavy and tend to allow moisture to infiltrate through the porous concrete wall of the vault, due to the hydrostatic pressure in the grave opening.

Prior burial vaults made entirely of synthetic plastic resinous material have been known and used heretofore and certain of them have desirable advantages and characteristics, but one disadvantage of certain of them is lack of adequate structural, tensile and flexural strength and resulting inability to withstand the crushing weight of the overlying earth load and the hydrostatic pressure when the vault is interred in the grave opening, and inability to withstand the additional weight of earth handling machinery moved thereover as occurs in cemetary operations.

Accordingly, an object of the present invention is to provide a new and improved composite wall burial vault which combines the desirable advantages and characteristics of certain of the prior art burial vaults while, at the same time, being substantially free from the aforesaid and other undesirable characteristics and disadvantages thereof.

A further object of the present invention is to provide a new and improved burial vault made in part of a concrete wall component or liner and in part of a resinous or like liner or wall component integrally and adhesively bonded to the concrete wall component, and which combines the desirable advantages and characteristics of a reinforced concrete burial vault, including the great structural and tensile strength of reinforced concrete burial vaults, with certain of the advantages of synthetic plastic resinous burial vaults including lightness in weight and attractive appearance; with the additional advantage which resides in the fact that synthetic plastic resinous materials are available in a wide variety and selection of colors and shades of colors which are much greater than the colors which are available in surface coatings applied to concrete or concrete-asphalt burial vaults; relative economy in manufacture, resistance to the corrosive action of water and other fluids when in the grave opening; relative lightness in weight and resulting ease of handling and transportation; and other desirable advantages and characteristics as discussed hereinafter.

An additional object of the present invention is to provide a new and improved burial vault embodying a concrete wall component and a synthetic plastic resinous liner or wall component adhesively and integrally bonded thereto, and a novel method of making the new burial vault.

A further object of the present invention is to provide a novel method of forming a concrete inner wall component within an outer synthetic plastic resinous inner liner or wall component of one form of the new composite wall burial vault.

An additional object of the present invention is to provide, in one form thereof, a box or base portion and a cover unit for the vault, each embodying a synthetic plastic resinous wall component or liner which serves as a form or mold for forming the inner concrete wall component thereof.

Still another object of the present invention is to provide a new and improved composite wall burial vault which includes a box or base portion and a cover unit and in which the box or base portion and the cover unit each includes a lightweight synthetic plastic resinous liner or wall component which may be molded at a central molding plant and, being light in weight, may be readily and economically transported over substantial distances to burial vault plants where the new composite burial vault may be completed by coating the outer surfaces of the said synthetic plastic resinous wall component with a strong bonding adhesive such, for example, as an epoxy resin, and then forming the concrete wall component of the vault from a concrete mix applied on and over the thus adhesively coated surfaces of the synthetic plastic resinous liner or wall component of the box or base portion and of the cover unit, as forms or molds, without the necessity or need for expensive molds or forms, and so that when the concrete mix sets the concrete wall components are adhesively and integrally bonded to the synthetic plastic resinous liners or wall components to provide a new composite wall burial vault which is possessed of adequate structural, tensile and flexural strength, water and corrosion resistance, relative lightness in weight, and other desirable advantages and characteristics including those herein set forth.

Another object of the present invention is to provide, in one form thereof, a new and improved burial vault which includes a box or base portion and a cover unit therefor each of which includes a synthetic plastic resinous outer liner or wall component and a synthetic plastic resinous inner liner or wall component, and an inner concrete wall component, and in the practice of which new method all of such synthetic plastic resinous liners or wall components may be molded or formed in any suitable manner, at a central molding plant and, being light in weight, distributed to the plants of burial vault manufacturers at distant locations where the synthetic plastic resinous inner and outer liners or wall components may be coated on their inner surfaces with a strong bonding adhesive, such as an epoxy resin, and then assembled in spaced relationship to provide inner wall spaces in the box or base portion, and in the cover unit of the vault, which may then be filled with a concrete mix which, when set, becomes adhesively and integrally bonded to the inner and outer synthetic plastic resinous wall components of the box or base portion and of the cover unit to complete this form of the new burial vault.

A further object of the invention is to provide a new and improved burial vault and a novel method of making the same and in which the thickness of the concrete wall components thereof may be reduced relative to the thickness of the wall of prior concrete burial vaults so as to provide a composite wall burial vault which is relatively light in weight, compared to prior concrete burial vaults while, at the same time, possessing equally as good structural, tensile and flexural strength as prior concrete burial vaults embodying concrete walls of substantially greater thickness.

Still another object of the invention is to provide a new and improved composite wall burial vault which may be used for making small or so-called baby size vaults and also for making adult size burial vaults.

A further object of the invention is to provide a new and improved composite wall burial vault which includes an outer concrete wall component and an inner plastic resinous finish coating or liner and a novel method of making the same.

A further object of the invention is to provide, in one form thereof, a novel composite wall burial vault including an inner concrete wall or liner, an inner finish or liner coating on the inner surface of the inner concrete wall or liner and adhesively and integrally bonded thereto, and an outer liner or coating on the outer surface of the inner concrete wall or liner and adhesively and integrally bonded thereto, and a novel method of making the new burial vault.

Still another object of the invention is to provide a new and improved burial vault embodying a novel composite wall construction including a double concrete wall or liner construction and a novel method of making the same.

An additional object of the invention is to provide in one form thereof a novel burial vault embodying a novel composite wall construction including an inner plastic resinous liner arranged between and adhesively and integrally bonded to the inner and outer concrete wall components.

A further object of the invention is to provide a novel burial vault embodying one or more synthetic plastic resinous liners adhesively and integrally bonded to a concrete wall component and a novel method of making the plastic resinous liners and a novel method of adhesively and integrally bonding the synthetic plastic resinous liner to the concrete wall component.

A further object of the invention is to provide, in one form thereof, a novel burial vault construction including reinforcing coatings applied throughout the areas of maximum stress in the side and end wall of the box or base portion of the vault.

An additional object of the invention is to provide a new and improved composite wall burial vault which embodies a synthetic plastic resinous inner liner formed by applying a synthetic plastic resinous coating over a steel or like mold, as by spraying, so that when the resinous coating is cured and the mold stripped therefrom, the plastic resinous inner liner thus formed has an inner surface which is a mirror image of the mold and embodies a smooth uninterrupted surface which provides a neat and attractive appearance.

Other objects will appear hereinafter.

One embodiment of the new composite wall burial vault is illustrated in FIGS. 1 to 16, inclusive, of the drawings, wherein it is generally indicated at 25, and includes a lower box or base portion 26 and a cover unit 27. The box or base portion 26 includes a synthetic molded plastic resinous wall component 28 which may be formed of lightweight synthetic molded plastic resinous material such, for example, as high impact polystyrene resin, such as Dow 453 (Dow Chemical Company) which is a butadiene-styrene copolymer and which can be vacuum formed or formed by rotational casting equipment from the aforesaid resin material in powdered form, or from glass fiber reinforced polyester resin, budadiene-styrene or butadiene-acrylonitrile copolymers, such as "Cycolac-H" (Marbon Chemical Division of Borg Warner Corporation) or the like, by vacuum forming, rotational casting, or other forming or molding operation.

The cover unit 27 likewise includes a synthetic molded plastic resinous wall component 29 which may likewise be molded of any suitable synthetic plastic resinous material, such as those referred to above, and includes an outer top wall 30, outer side walls 31, and outer end walls 32 each of which has an upwardly and inwardly extending wall portion 33.

Figures 1, 2, 3:
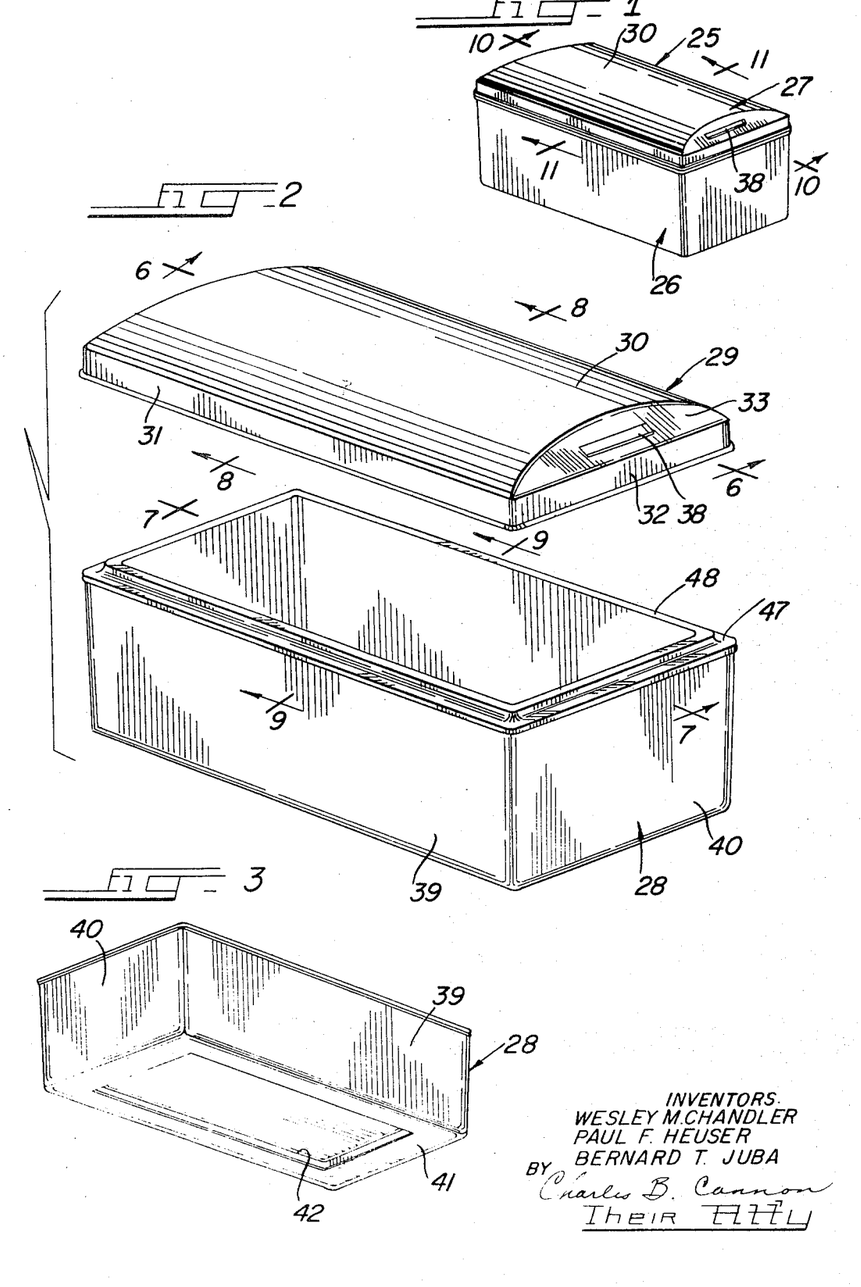
FIG. 1 is a perspective view of one embodiment of the new composite wall burial vault.
FIG. 2 is an exploded perspective view of the construction of that form of the new composite wall burial vault illustrated in FIG. 1.
FIG. 3 is a perspective bottom view of the synthetic molded plastic resinous wall component of the box or base portion of that form of the new composite wall burial vault which is illustrated in FIGS. 1 and 2.
Figure 4:
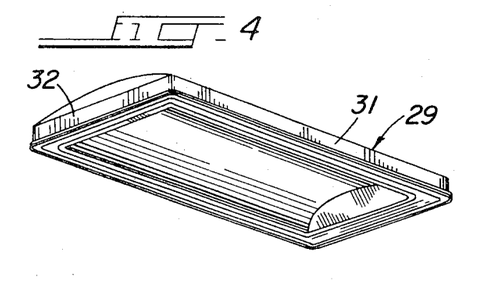
FIG. 4 is a bottom perspective view of the synthetic molded plastic resinous wall component of the cover portion of that form of the new composite wall burial vault which is illustrated in FIGS. 1 and 2.
Figure 5:
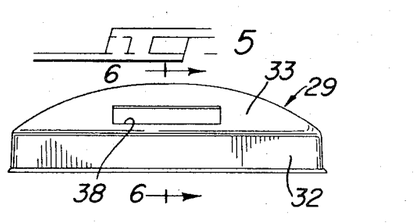
FIG. 5 is an end elevational view of the synthetic molded plastic resinous wall component of the cover portion of that form of the new composite wall burial vault which is illustrated in FIGS. 1, 2 and 4, and showing the filling opening in one end wall of the cover portion of the vault for the introduction of a concrete mix into the inner wall space of the cover unit.
Figure 6:
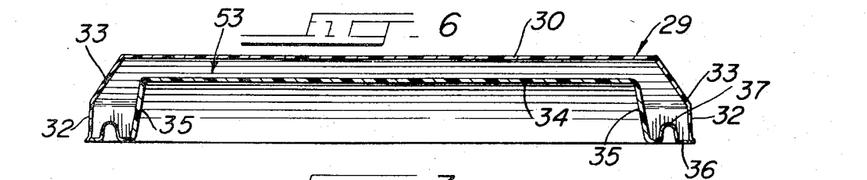
FIG. 6 is a central vertical longitudinal sectional view, on line 6—6 in FIG. 2, showing the internal construction of the molded synthetic plastic resinous wall component of the cover portion of that form of the new composite wall burial vault which is illustrated in FIGS. 1, 2, 4 and 5.
Figures 7, 8:
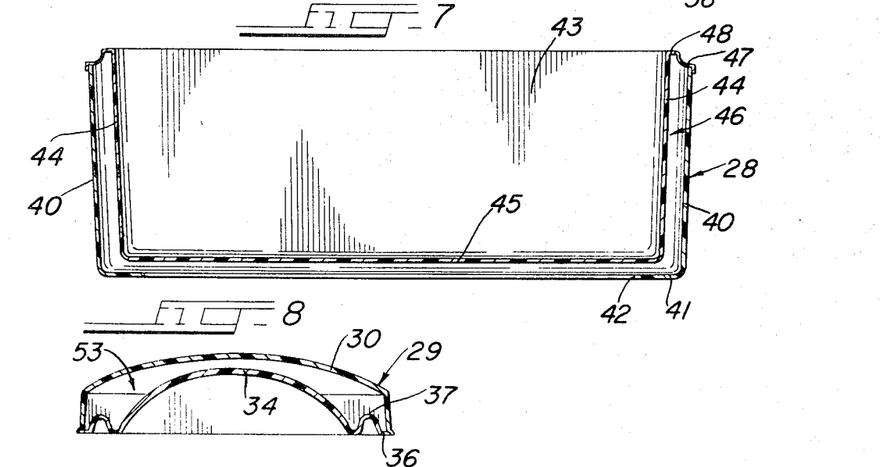
FIG. 7 is a central vertical longitudinal sectional view on line 7—7 in FIG. 2, illustrating the construction of the synthetic molded plastic resinous wall component of the box or base portion of that form of the new composite wall burial vault which is illustrated in FIGS. 1, 2 and 3.
FIG. 8 is a transverse vertical sectional view, on line 8—8 in FIG. 2, illustrating the construction of the synthetic molded plastic resinous wall component of the cover portion of that form of the new composite wall burial vault which is illustrated in FIGS. 1, 2, 4, 5 and 6 of the drawings.

The synthetic molded plastic resinous wall component 29 of the cover unit 27 also includes an inner top wall 34 which is spaced from the outer top wall 30, inner end walls 35, and a horizontally and marginally extending interconnecting flange or web member 36 which extends between the inner and outer walls 34-35 and 30-32 of the cover unit 27 and has an upwardly extending marginal sealing groove 37 formed therein.

The upwardly and inwardly angled end wall portion 39 of one of the end walls 32 of the cover unit 27 is provided with a filling opening 38 for the introduction of a concrete mix, as shown in FIGS. 1, 2, 5, 6, 12 and 14, as will be described more fully hereinafter.

The lightweight synthetic molded plastic resinous wall component 28 of the box or base portion 26 of the new composite wall burial vault 25, embodying the construction illustrated in FIGS. 1 to 16, inclusive, includes outer side walls 39, outer end was 40 and an outer bottom wall 41 which has a filling opening 42 formed therein for the introduction of a concrete mix, as shown in FIGS. 7, 9, 10, 11, 13, 14, 15 and 16, and as will be described more fully hereinafter.

The synthetic molded plastic resinous wall component 28 of the box or base portion 26 of the new composite wall burial vault 25, embodying the concstruction illustrated in FIGS. 1 to 16, inclusive, also includes an inner synthetic molded lightweight plastic resinous wall component which includes inner side walls 43, inner end walls 44, and an inner bottom wall 45. The inner synthetic molded plastic resinuous wall component 43-44-45 is spaced from the outer synthetic molded plastic resinous wall component 39-40-41 of the box or base portion 26 of the vault 25 to provide an inner wall space 46 therein, for the reception of a concerte mix, as will be described more fully hereinafter.

The inner synthetic molded plastic resinuous wall component 43-44-45 of the box or base portion 26 of the new composite wall burial vault 25, embodying the construction illustrated in FIGS. 1 to 16, inclusive, also has a horizontally extending top marginal flange 47 which extends around and closes the top of the inner wall space 46 between the inner and outer synthetic plastic resinous wall components of the box or base portion 28 of the vault 25 so as to seal the inner wall space therein at the top thereof, as shown in FIGS. 2, 7, 9, 10, 11, 14 and 15. This horizontally extending top marginal flange 47 has an upwardly and marginally extending shoulder portion 48 thereon at its inner end which is adapted to fit into and to be sealed in the cover sealing groove 37 in the marginal flange member 36 of the synthetic molded plastic resinous wall component 29 of the cover unit 27.

In making that form of the new composite wall burial vault which embodies the construction illustrated in FIGS. 1 to 16, inclusive, the lightweight synthetic molded plastic resinous inner wall or liner unit 43–44–45 and the lightweight synthetic molded plastic resinous outer wall or liner unit 39–40–41 of the synthetic molded plastic resinous wall component 28 of the box or base portion 26 and the lightweight synthetic molded plastic resinous outer wall or liner unit 30–31–32–33–38 and the inner wall or liner unit 34–35–36 of the synthetic molded plastic resinous wall component 29 of the cover unit 27 may be molded as separate units, at a central location and, being light in weight, may be readily and economically transported to the plants of burial vault manufacturers in various locations where they may be assembled and the new composite wall burial vaults completed by forming the internal concrete wall component or liners therein, in accordance with the method which will now be described.

Figure 9:
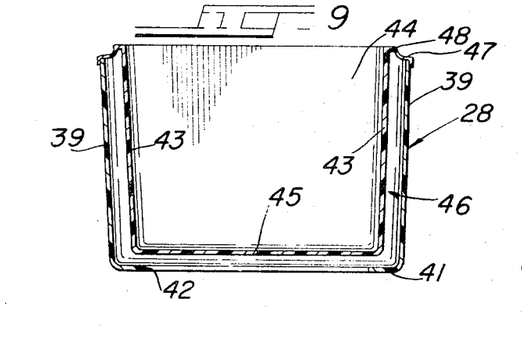
FIG. 9 is a transverse vertical sectional view, on line 9—9 in FIG. 2, illustrating the construction of the synthetic molded plastic resinous wall component of the box or base portion of that form of the new composite wall burial vault which is illustrated in FIGS 1 to 8, inclusive, prior to forming the concrete inner wall liner or component therein.

Thus, the base or box portion 26 of the new composite wall burial vault 25, embodying the construction illustrated in FIGS. 1 to 16, inclusive, may be completed by first coating all of the inner surfaces of the inner synthetic molded plastic resinous wall or liner units 43–44–45 and of the outer wall or liner units 39–40–41 of the synthetic molded plastic resinous wall component 28 of the box or base portion 26 and coating all of the inner surfaces of the outer wall or liner unit 30–31–32–33 and of the inner wall or liner unit 34–35–36 of the synthetic molded plastic resinous wall component 29 of the cover unit 27 with a strong bonding adhesive coating such, for example, as an epoxy resin coating 49 (FIGS. 14–16), or other strong bonding adhesive, as by spray coating, brush coating, or the like. The thus coated inner wall or liner unit 43–44–45 and the outer wall liner unit 30–31–32–33 of the synthetic molded plastic resinous wall component 28 of the box or base portion 26 of the vault may then be assembled as shown in FIG. 9 and integrally joined together by applying a suitable solvent bonding agent, such, for example, as ethylene dichloride, or other suitable solvent for the particular synthetic resinous material used in making the synthetic molded plastic resinous inner and outer liner or wall components, between the meeting surfaces of the marginal flange 47 of the inner wall or liner unit 43–44–45 and the upper marginal edges of the side walls 39—39 and end walls 40—40 of the outer wall or liner unit 39–40–41 so as to soften the resinous material in those wall parts and thus, when dried or cured, integrally bonding or joining these parts together.

Figure 16:
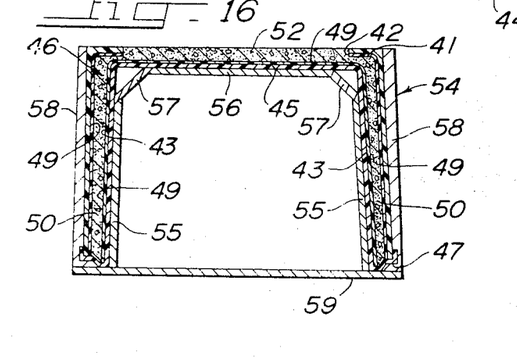
FIG. 16 is a transverse vertical sectional view illustrating the novel method embodied in the present invention for forming the concrete inner wall liner or component of the box or base portion of that form of the new vault which is illustrated in FIGS. 1 to 15, inclusive.

The assembled synthetic molded plastic resinous wall component 28 of the box or base portion of the vault may then be inverted, into the position in which it is shown in FIG. 16 of the drawings, whereupon the synthetic molded plastic resinous wall component 28 of the box or base portion 26 of the vault 25 may be used as a mold or form to mold the concrete inner wall component thereof, which is accomplished by pouring a suitable concrete mix of lightweight or heavy aggregate, as may be desired, through the filling opening 42 in the bottom wall 41 thereof, while the adhesive bonding coating 49 is still in a tacky condition, while at the same time, vibrating the unit so as to completely fill the inner wall space 66 in the synthetic molded plastic resinous wall component 28 of the box or base portion 26 of the new composite burial vault 25 with the concrete mix, which is thereupon allowed to harden and cure. Thus, when the concrete mix thus poured into the inner wall space 46 in the synthetic molded plastic resinous wall component 28 of the box or base portion 26 of the vault 25 sets and hardens it forms the concrete inner wall liner or component of the box or base portion 26 of the vault 25 including concrete side walls 50, concrete end walls 51, and a concrete bottom wall 52 in the box or base portion 26 of the vault 25, and when the bottom concrete wall 52 is thus formed it seals off and closes the filling opening 42 in the outer bottom wall 41 of the synthetic molded plastic resinous wall component 28 of the box or base portion 26 of the vault, as illustrated in FIGS. 13, 14, 15 and 16 of the drawings.

When the inner concrete wall liner or component 50–51–52 of the box or base portion 26 of the form of the new composite wall burial vault 25 shown in FIGS. 1 to 16, inclusive, is thus formed, it is adhesively and integrally bonded to the synthetic molded plastic resinous inner wall or liner unit 43–44–45 and to the synthetic molded plastic resinous outer wall or liner unit 39–40–41 of the synthetic molded plastic resinous wall component 28 of the box or base portion 26 of the vault 25 by the epoxy resin or like bonding adhesive 49, so that when the tacky adhesive bonding coating 49 dries or cures and the concrete mix sets and hardens the molded plastic resinous inner wall or liner 28 of the box or base portion 26 of the vault 25 is adhesively and integrally bonded to the concrete wall component 50–51–52 by the adhesive bonding coating 49, so that they form, in effect, a single integral composite wall construction.

In the practice of the present invention, as illustrated in FIGS. 1 to 16, inclusive, the synthetic molded plastic resinous wall component 28 of the box or base portion 26 of the vault 25 serves as the form or mold for molding or forming the inner concrete wall liner or component 50–51–52 thereof, and all that is required in addition thereto is a simple and inexpensive reinforcing form unit, which is generally indicated at 54 in FIG. 16, and which may be made of plywood or like relatively inexpensive material, or if desired, a so-called outside steel form may be used for this purpose. The reinforcing form unit 55 includes inner side wall brace members 55—55, a thin top (bottom) wall brace member 56, inner corner struts or braces 57—57, outer side wall brace members 58—58, and a bottom supporting member 59, which may be assembled, as shown, so as to reinforce the synthetic molded plastic resinous walls 43–44–45 of the synthetic molded plastic resinous wall component 28 of the box or base 26 during the time the concrete mix is being poured through the filling opening 42 in the outer bottom wall 41 into the inner wall space 46 in the synthetic molded plastic resinous wall component 28 thereof. During this operation the entire assembly, as shown in FIG. 16 may be vibrated by means of any suitable vibrating apparatus, so as to facilitate the flow and movement of the concrete mix into and throughout the inner wall space 46 in the synthetic molded plastic resinous wall component 28 of the box or base 26.

Similarly, the entire inner wall surface of the outer wall or liner member 30–31–32 and the entire inner wall surface of the inner wall or liner 34–35–36 of the synthetic molded plastic resinous wall component 29 of the cover unit 27 may be coated, as by spray coating, brush coating, or the like, with an epoxy resin or like bonding adhesive coating 49.

Figure 10:
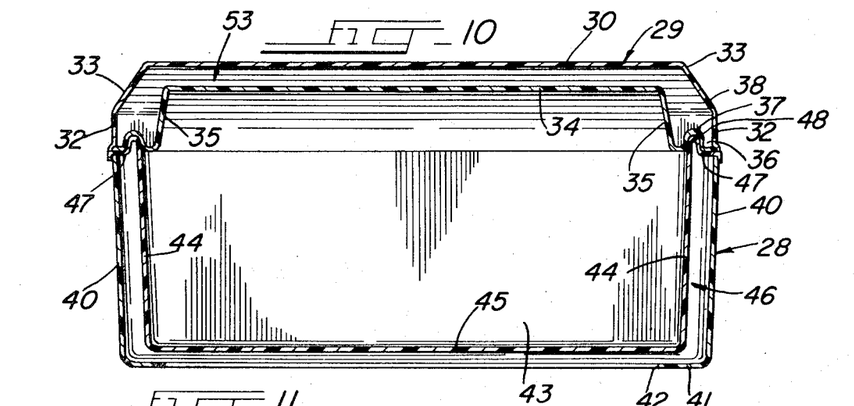
FIG. 10 is an enlarged central vertical longitudinal sectional view, on line 10—10 in FIG. 1, illustrating the synthetic molded plastic resinous wall components of the box or base portion and of the cover portion of that form of the new composite wall burial vault which is illustrated in FIGS. 1 and 2, in assembled position.
Figure 11:
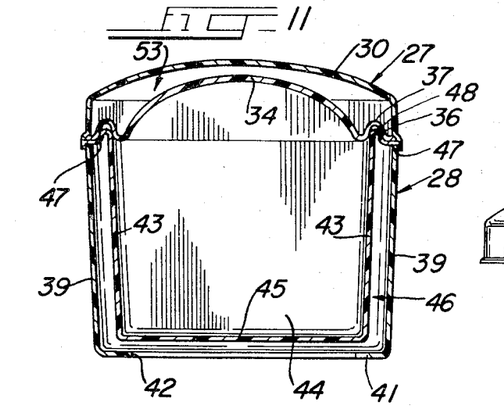
FIG. 11 is an enlarged transverse vertical sectional view, on line 11—11 in FIG. 1, illustrating the synthetic molded plastic resinous wall components of the box or base portion and of the cover portion of that form of the new composite wall burial vault which is illustrated in FIGS. 1 to 19, inclusive, in assembled position.

The outer wall or liner unit 30–31–32 and the inner wall or liner unit 34–35–36 may then be assembled in spaced relationship to provide an inner wall space 53 in the synthetic molded plastic resinous wall component 29 of the cover unit 27. The thus coated parts of the cover unit 27 may be assembled, as shown in FIGS. 8, 10 and 11, and integrally bonded together by applying ethylene dichloride or other suitable solvent for the resinous material embodied in the resinous wall structure, to the mating surfaces between the lower marginal edge portions of the outer liner or wall member 30–31–32 and the outer marginal edges of the inter-connecting marginal web and ceiling groove member 36 so as to integrally bond these parts together in the assembled cover unit when the thus solvent-softened plastic resinous walls harden (FIGS. 8, 10 and 11).

The thus assembled synthetic molded plastic resinous wall component 29 of the cover unit 27 may then be inverted at a suitable angle relative to the vertical, and rested upon any suitable support, and a suitable heavy or light concrete mix, as may be desired, poured through the filling opening 38 in the upwardly angled portion 33 of one end wall 32 of the synthetic molded plastic resinous wall component 29 of the cover unit 27, while the epoxy resin or like bonding adhesive coating is still tacky, so as to fill the inner wall space 53 in the synthetic molded plastic resinous wall component 29 of the cover unit 27 with the concrete resinous wall component 29 of the cover unit 27, as the concrete mix is poured through the filling opening 38 into the inner wall space 53 thereof.

When the concrete mix in the inner wall space 53 of the synthetic molded plastic resinous wall component 29 of the cover unit 27 hardens and cures it forms the concrete inner wall liner or component 60 of the cover unit 27, and when the adhesive bonding coating 49 dries or cures the concrete inner wall or liner component 60 of the cover unit 27 is adhesively and integrally bonded, by the dried or cured epoxy resin or like strong bonding adhesive coating 49, so the concrete inner wall component 54, so as to provide a cover unit 27 embodying a single integral composite wall construction.

During the operation of pouring the concrete mix through the filling opening 38 in one end wall 32–33 of the synthetic molded plastic resinous wall component 29 of the cover unit 27, the synthetic molded plastic resinous wall component 29 of the cover unit 27 serves as a form or mold for forming the concrete inner wall component 60 so that no extraneous or outside form or mold is needed for this purpose.

Figure 12:
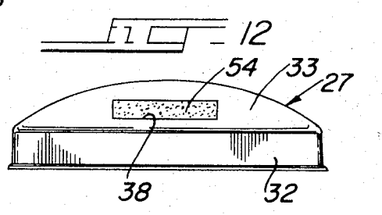
FIG. 12 is an end elevational view of the cover unit of that form of the new composite burial vault which is illustrated in FIGS. 1, 2, 4, 5, 6, 8, 10 and 11 and showing the synthetic molded plastic resinous wall component of the cover unit of the vault and the filling opening therein filled with concrete.
Figure 13:
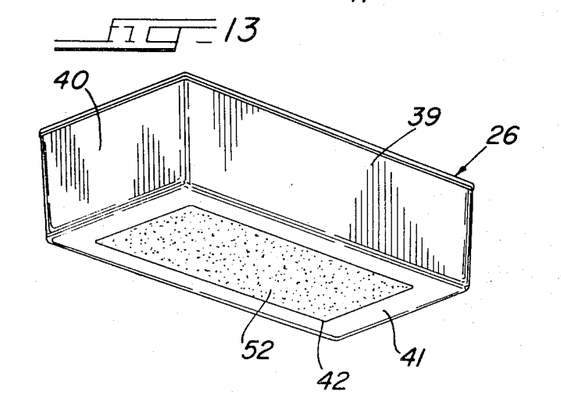
FIG. 13 is a bottom perspective view of the box or base portion of that form of the new composite burial vault which is illustrated in FIGS. 1, 2, 3, 7, 9, 10 and 11 showing the synthetic molded plastic resinous wall component of the box or base portion of the vault and the filling opening in the bottom wall thereof filled with concrete.
Figure 14:
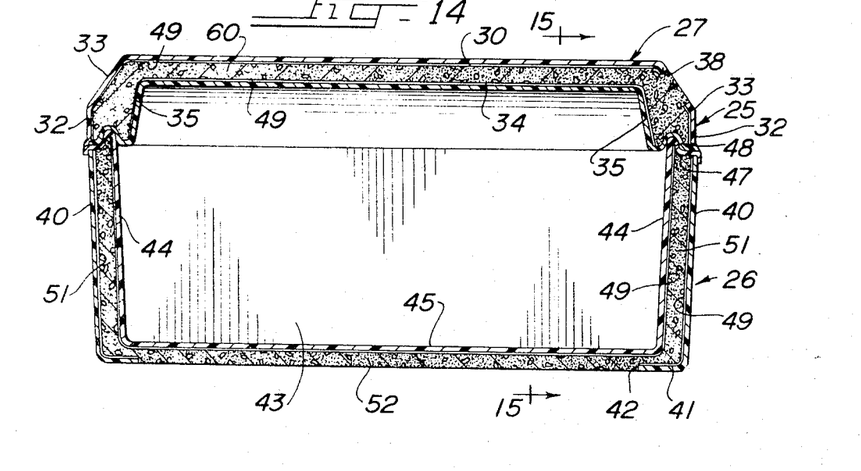
FIG. 14 is a central vertical longitudinal sectional view, similar to FIG. 10, but showing the synthetic molded plastic resinous wall components of the cover unit and of the box or base portion of the form of the new burial vault illustrated in FIGS. 1 to 13, inclusive, filled with concrete to provide the inner concrete wall liners or components therein.
Figure 15:
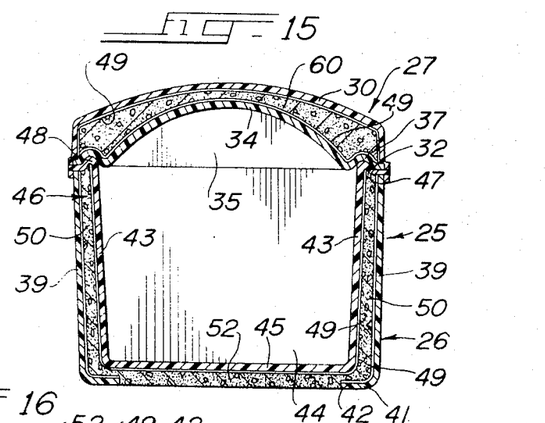
FIG. 15 is a transverse vertical sectional view on line 15—15 in FIG. 14.

When the inner concrete wall component 60 of the cover unit 27 is thus completed, it closes and seals off the filling opening 38 in the cover unit 42 (FIGS. 12 and 14).

When the box or base portion 26 and the cover unit 27 of the new composite burial vault 25 are thus completed, they may be assembled and sealed in a grave opening with the marginal shoulder 48 on the marginal flange portion 47 of the box or base portion 26 extending into the marginal sealing groove 37 in the member 36 of the cover unit 27, and suitably sealed therein by means of any suitable vault sealing material such, for example, as an epoxy resin, asphaltic sealing materials, or the like, as is well understood in the art.

Another form of the new composite wall burial vault is illustrated in FIGS. 17–21, inclusive, of the drawings, wherein it is generally indicated at 61, and includes a box or base portion 62 and a cover unit 63. The box or base portion 62 includes an outer concrete wall component 72 which includes side walls 73, end walls 74 and a bottom wall 75. The box or base portion 62 of the vault 61 embodies a synthetic molded plastic resinous inner liner or wall component 64, which includes side walls 65, end walls 66 and a bottom wall 67.

The box or base portion 62 of the new composite wall burial vault 61, as illustrated in FIGS. 17 to 21, inclusive, is made by molding the synthetic plastic resinous inner wall or liner unit 64 of any suitable synthetic plastic resinous molding resin, such as those referred to hereinbefore.

Figure 17:
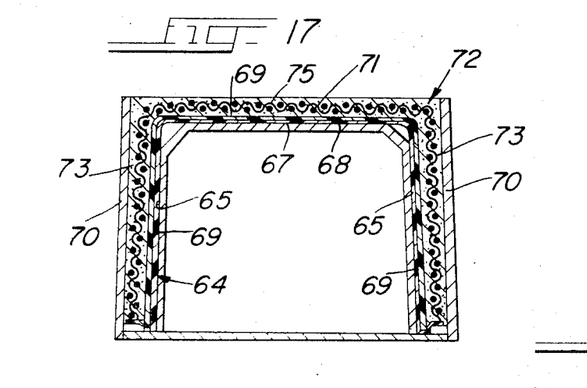
FIG. 17 is a transverse vertical sectional view illustrating another form of construction of the box or base portion of the new composite wall burial vault and illustrating the novel method of the present invention for forming the same.

The box or base portion 62 of the vault 61 is then completed by applying a coating 69 of a bonding adhesive, such as an epoxy resin, as by spraying, brush coating, or the like, over the entire outer surface of the inner synthetic molded plastic resinous liner 64 for the box or base portion 62 of the vault 61 including the side walls 65, end walls 66 and bottom wall 67.

A suitable steel or like outer concrete form 70 is then provided outwardly of the thus adhesively coated outer side wall surface of the inner synthetic molded plastic resinous inner liner 64, as shown in FIG. 17. Suitable wire mesh or like reinforcing material 71 may then be laid in position within the form 70 and between the latter and the adhesive bonding coating 69 on the outer surfaces of the side walls 65 and end walls 66 and across the then upper bottom wall 67 of the inner liner 64, and shown in FIG. 17.

A suitable concrete mix of heavy or lightweight aggregate, as may be desired, is then poured into the concrete wall forms 70 and between the latter and the adhesive bonding coating 69 on the outer surfaces of the inner synthetic molded plastic resinous liner 64 and around the wire or like reinforcing material 71, while the adhesive bonding coating 69 is still tacky, so as to form the concrete outer wall component 72 of the box or base portion 62 including the concrete side walls 73, end walls 74 and bottom wall 75 of the concrete wall component 72 of the box or base portion 62 of the vault 61. During this operation, the concrete bottom wall 75 of the outer concrete wall component 72 is formed by pouring the concrete mix over the then adhesively coated upper or bottom wall 67 of the inner liner 64 and trowelling or otherwise shaping the same to form the bottom concrete wall component 75 of the concrete wall component 72 of the base 62 of the vault 61.

The concrete mix may then be allowed to set and cure to form the outer concrete wall component 72 of the box or base portion 62 of the vault 61, whereupon the mold form 70 may be removed therefrom.

Figure 18:
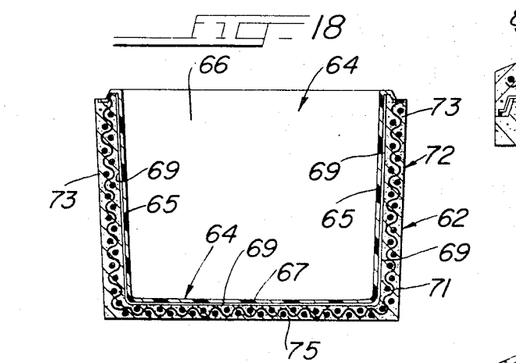
FIG. 18 is a central vertical transverse sectional view illustrating the construction of the box or base portion of the new composite wall burial vault made in accordance with the method illustrated in FIG. 17.

When the box or base portion 62 of the vault 61 is thus formed it embodies a composite wall construction including the synthetic molded plastic resinous inner liner 64 which is integrally bonded to the concrete outer wall component 72 by the cured adhesive bonding coating 69 of epoxy resin, or other strong bonding adhesive, so as to form a strong but relatively lightweight composite wall construction which has high structural, tensile and flexural strength while, at the same time, being highly water-resistant and highly resistant to the corrosive action of water and other fluids in the grave opening.

Figure 19:
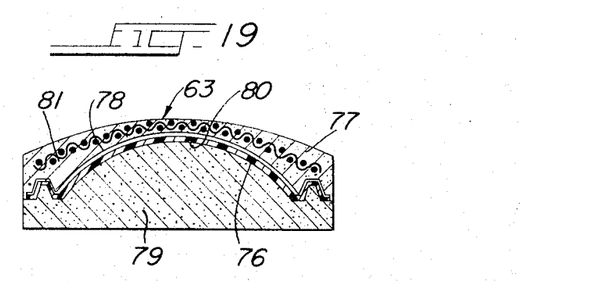
FIG. 19 is a transverse vertical sectional view illustrating the novel construction of the cover unit of the new composite burial vault which is used with the box or base portion thereof illustrated in FIGS. 17 and 18, and illustrating the novel method of the present invention for forming the same.
Figure 20:
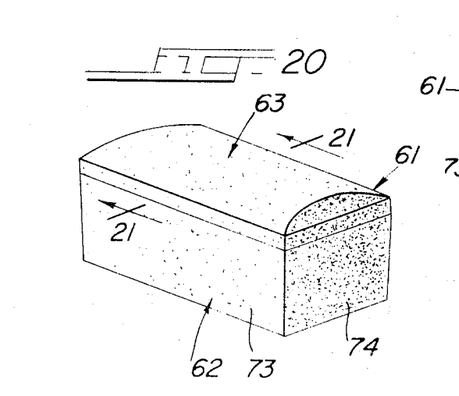
FIG. 20 is a perspective view of the complete form of the new composite burial vault illustrated in FIGS. 17 to 19, inclusive, in assembled condition.
Figure 21:
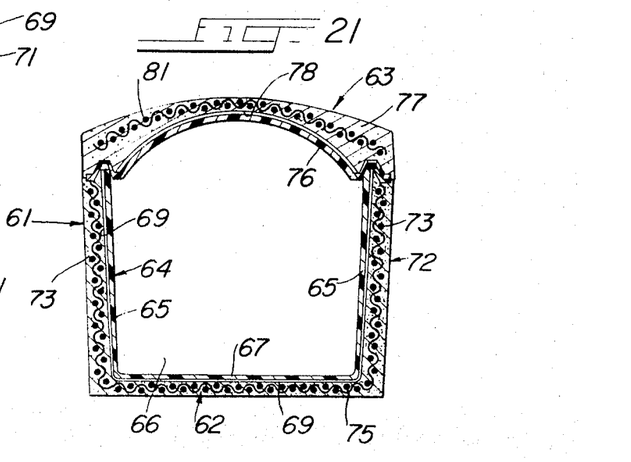
FIG. 21 is an enlarged transverse vertical sectional view on line 21—21 in FIG. 20.

The cover unit 63 which is embodied in the form of the new composite burial vault illustrated in FIGS. 17 to 21, inclusive, is illustrated in FIGS. 19, 20 and 21, and includes a synthetic molded plastic resinous inner liner or wall component 76 and an outer concrete wall component 77, and the outer or upper surface of this molded synthetic plastic resinous inner linear component 76 is provided with a coating 78 of an epoxy resin or like strong bonding adhesive, before the outer concrete wall component 77 is formed thereon.

In forming the cover unit 63 for use in the form of the invention illustrated in FIGS. 17 to 21, inclusive, the suitably molded and shaped synthetic plastic resinous inner liner 76 may be arranged over the convexly curved upper surface 80 of a molding form or jig 79, which may be made of concrete or like material, and an epoxy resin or like strong bonding adhesive coating 78 may then be provided thereon, in any suitable manner, as by spray coating, brush coating, or the like. Steel wire or like reinforcing material 81 may then be laid over the adhesively coated molded plastic resinous liner 78 and a suitable concrete mix poured thereover and suitably formed and shaped, as by hand trowelling, or the like, while the adhesive bonding coating 78 is still tacky. When the concrete mix for the thus reinforced concrete outer wall component 77–81 sets and hardens, and the adhesive bonding coating 78 dries, the outer concrete wall component 77–81 becomes firmly and integrally bonded to the synthetic molded plastic resinous inner liner or wall component 76 by the cured epoxy resin or like bonding adhesive coating 78, thereby enhancing the structural, tensile and flexural strength of the cover unit 63 while, at the same time greatly increasing its resistance to water and other fluids to which the vault may be subjected in the grave opening.

The box or base portion 62 of the form of the new composite burial vault which is illustrated in FIGS. 17 and 18, and the cover unit 63 therefor, as shown in FIG. 19, may then be assembled to provide the complete vault embodying the form of the invention illustrated in FIGS. 20 and 21.

In molding the synthetic plastic resinous wall components of the box or base portion 26 of the cover unit 27 of the vaults illustrated in FIGS. 1 to 16, inclusive, and in FIGS. 17 to 21, inclusive, any suitable molding resin may be employed and among these are high impact polystyrene resin, such as that known as Dow-Styron (Dow Chemical Company), glass fiber reinforced polyester resins, and other materials hereinafter referred to.

Another form of construction of the new composite wall burial vault made in accordance with the present invention is illustrated in FIGS. 22 to 26, inclusive, of the drawings, wherein it is generally indicated at 82 and includes a box or base portion 83 and a cover unit 84. The box or base portion 83 includes an outer concrete wall component 85 having steel wire mesh or like reinforcing material 86 embedded therein. The box or base portion 83 also includes an inner liner component which comprises a coating 87 of a strong bonding adhesive such, for example, as a epoxy resin coating, or other suitable adhesive bonding material, as discussed hereinafter, and which will adhere firmly to wet concrete; and a second and inner liner finish coating 88 which is applied over the adhesive coating 87 throughout the entire inner surface of the concrete component 85 of the box or base portion 83; the inner liner finish coating 88 being adhesively and integrally bonded to the concrete wall component 85 by the adhesive bonding coating 87.

Figure 22:
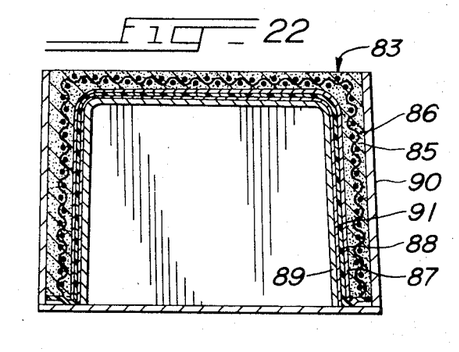
FIG. 22 is a transverse vertical sectional view illustrating the box or base portion of a composite wall burial vault embodying another form of the invention and illustrating the method of forming the same.
Figure 26:
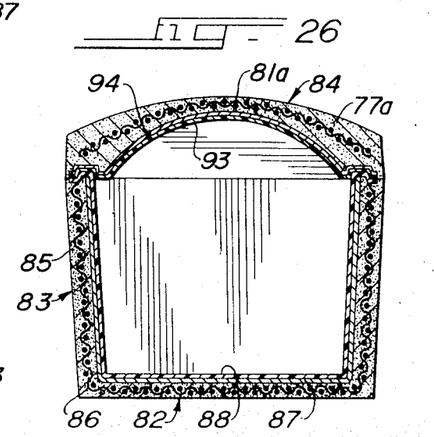
FIG. 26 is an enlarged transverse vertical sectional view on line 26—26 in FIG. 25.

The method of making the box or base portion 83 of the new burial vault 82 illustrated in FIGS. 22 and 26, inclusive, of the drawings, is illustrated in FIG. 22, and comprises the steps of providing a suitable box-like inner core or mold 89, of steel or other suitable material, and a suitable outer core or mold 90. A release coating 91, such for example, as a coating of petroleum wax (paraffin) or other release agent, is first applied over the entire outer surface of the steel or like inner mold or form 89. An interior finish surface coating or liner 88, which may be an air-drying latex, or other suitable material, as discussed hereinafter, is then applied as by spraying, brushing, or the like, over the release coating 91, and upon drying this coating 88 provides a continuous solidified coating or liner. The adhesive bonding coating 87 is then applied, in any suitable manner, as by spraying, brushing or the like, over the inner liner coating 88.

A suitable concrete mix, which may be a heavy concrete mix or a lightweight concrete mix or aggregate, as desired, is then poured into the outer concrete mold or form 90, while the adhesive bonding coating 87 is still tacky, and when the concrete mix sets and hardens, and the adhesive bonding coating 87 dries, the concrete wall component 85 is adhesively and integrally bonded to the inner finish liner 88 by the cured adhesive bonding coating 87.

Figure 23:
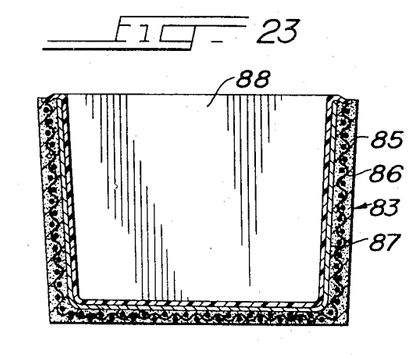
FIG. 23 is a transverse vertical sectional view illustrating the construction of the form of the box or base portion of the burial vault made in accordance with the method illustrated in FIG. 22.

In this manner, the inner liner unit 87–88 is formed and it is integrally bonded by the adhesive bonding coating 88 thereof to the concrete outer wall component 85–86, thereby completing the form of the box or base portion of the new burial vault illustrated in FIG. 23 and which embodies the reinforced concrete outer wall component 85–86 and the inner liner component 87–88.

Figure 24:
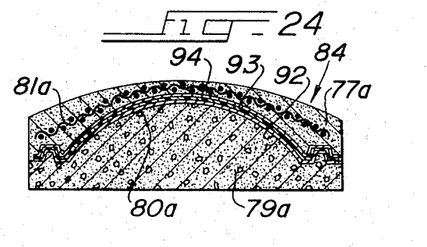
FIG. 24 is a transverse vertical sectional view illustrating the construction of the cover unit adapted for use with the box or base portion of the vault illustrated in FIG. 23 and illustrating the method of forming the same.
Figure 25:
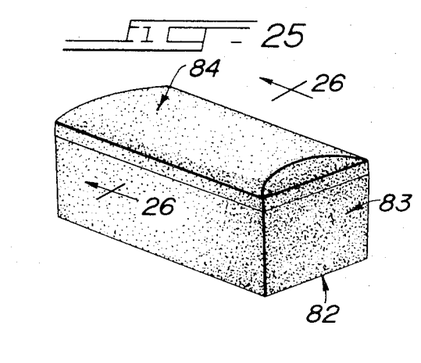
FIG. 25 is a perspective view illustrating the completed and assembled form of the new burial vault illustrated in FIGS. 23 and 24.

The cover unit for the form of the new burial vault 82 which is illustrated in FIGS. 22 to 26, inclusive, is illustrated in FIGS. 24, 25 and 26, and the method of making the same is illustrated in FIG. 24; those parts in FIG. 24 which are similar or comparable to corresponding parts of the cover unit illustrated in FIG. 19 being given the same reference numeral with the additional and distinguishing reference character "a."

The cover unit 84 illustrated in FIGS. 24 and 26 includes an outer concrete wall component 77a having steel wire mesh or like reinforcing material 81a embedded therein and the cover unit 84 also includes an inner finish liner coating 93 of suitable resinous material, airdrying latex, or other suitable material, as discussed hereinafter, and which is adhesively and integrally bonded to the outer concrete wall component 77a–81a by means of an adhesive bonding coating 94 which may be a coating of epoxy resin, or other strong bonding adhesive.

In making the cover unit 84 for the form of the invention illustrated in FIGS. 22 to 26, inclusive, the convexly upwardly curved upper surface 80a of the mold or jig 79a is first provided with a coating 92 of a suitable release agent such, for example, as a petroleum wax coating (paraffin), or the like. The inner finish liner coating 93 is then applied, as by spraying, brushing, or the like over the release coating 92, and upon drying it forms a continuous solidified coating or liner 93.

The adhesive bonding coating 94 is then applied, as by spraying, brushing or the like, over the inner finish liner coating 93.

The outer surface of the concrete wall component 77a–81a of the cover unit 84 is then formed by laying the wire or like reinforcing material 81a in position above the adhesive bonding coating 94 and then pouring a suitable concrete mix thereover and shaping the same in any suitable manner, as by hand trowelling, or the like, while the adhesive bonding coating 94 is still tacky, to complete the outer concrete wall component 77a–81a of the cover unit 84.

When the outer concrete wall component 77a–81a of the cover unit 84 sets and hardens, the inner finish liner 93 is firmly and integrally bonded to the outer concrete wall component 77a–81a by the dried adhesive bonding coating 94, thereby providing a cover unit which has high structural, tensile and flexural strength, adequate water resistance, resistance to the corrosive action of water and other fluids to which the vault may be subjected in the grave opening, as well as having the other desirable advantages, and characteristics herein described.

An additional embodiment of the new composite wall burial vault is illustrated in FIGS. 27 to 31, inclusive, wherein it is generally indicated at 95, and includes a box or base portion 96 and a cover unit 97. The box or base portion 96 of the form of the invention illustrated in FIGS. 27 to 31, inclusive, includes an inner concrete wall component 98 and an outer liner 99 which may be in the form of glass fiber reinforced polyester resin, or other material, as described elsewhere herein, and which is adhesively and integrally bonded to the concrete inner wall component 98 by a strong adhesive bonding coating 100, which may be in the form of an epoxy resin, or other suitable strong bonding adhesive.

Figure 27:
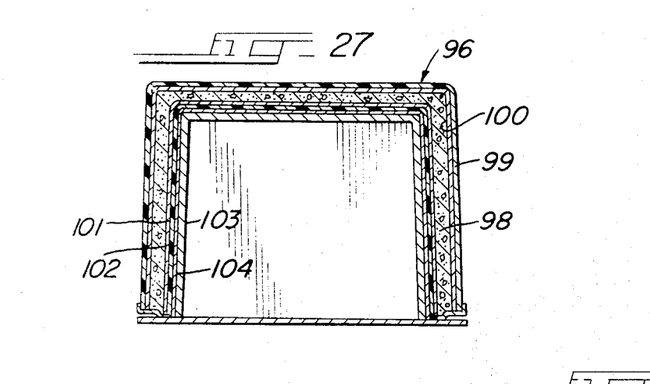
FIG. 27 is a transverse vertical sectional view illustrating the box or base portion of another form of burial vault embodying the present invention and illustrating the method of making the same.
Figure 28:
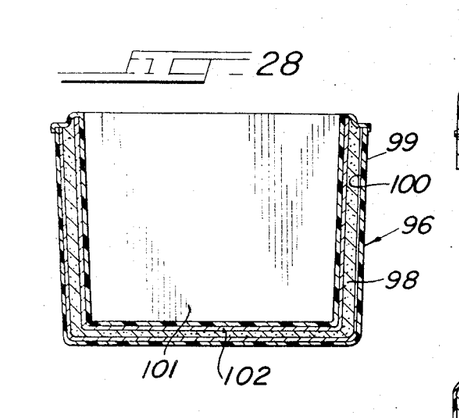
FIG. 28 is a transverse vertical sectional view illustrating the construction of the box or base portion of the burial vault made in accordance with the method illustrated in FIG. 27.

The box or base portion 96 of the vault 95 also includes an inner liner component which is comprised of an inner finish liner coating 101, of suitable material such, for example, as glass fiber-reinforced polyester resin, or the like, which is adhesively bonded throughout its entire outer surface, by an adhesive bonding coating 102, to the inner concrete wall component 98.

The method of making the box or base portion 96 of the vault 95 illustrated in FIGS. 27 to 31, inclusive, is shown in FIG. 27, and comprises the steps of first providing a suitable box-like inner core, mold or form 103 which may be of any suitable material such, for example, as a steel mold, over the outer surface of which there is first applied a release coating 104 of petroleum wax (paraffin) or other suitable release agent material, whereupon the inner finish liner coating 101 of glass fiber reinforced polyester resin, or other suitable material, is applied over the release coating 104, in any suitable manner as by spraying, brushing or the like, and upon drying it forms a continuous solidified liner coating 101, the inner surface of which has a texture or finish which is a mirror image of the mold surface. The adhesive inner bonding coating 102 is then applied over the inner liner finish coating 101 in any suitable manner, as by spraying, brushing, or the like. The inner concrete wall component 98 is then formed by pouring a suitable concrete mix around and over the adhesive bonding coating 102 while the adhesive bonding coating 102 is still in a tacky condition and before it dries.

The box or base portion 96 of the vault 95 illustrated in FIGS. 27 to 31, inclusive, is then completed by applying over the outer surface of the concrete inner wall component or liner 98, while the latter is still in a wet condition, the outer adhesive bonding coating 100 and then applying over the adhesive bonding coating 100, while the latter is still in a tacky condition, in any suitable manner, as by spraying, brushing or the like, the outer coating 99 of glass fiber reinforced polyester resin, or other suitable like material which, upon curing forms a continuous solidified coating. When the concrete mix which forms the inner concrete liner or wall component 98 sets and hardens, and the adhesive bonding coating 102 dries, the concrete liner or wall component 98 is integrally bonded to the inner liner or finish coating 101 by the inner adhesive bonding coating 102 and the outer liner 99 is firmly and integrally bonded to the inner concrete wall component or liner 98 by the outer adhesive bonding coating 100.

As an alternative to the procedure set forth above for making the box or base portion 96 of the vault 95 (FIGS. 27–31) the outer adhesive bonding coating 100 and the outer finish liner coating 99 may be applied over the vertical side wall surfaces of the box or base portion 96 of the vault 95 at the same time as the inner bonding coating 102 and the inner finish liner coating 101 are applied to the vertical wall surfaces of the box or base portion 96 of the vault 95 (FIGS. 27–31).

Figure 29:
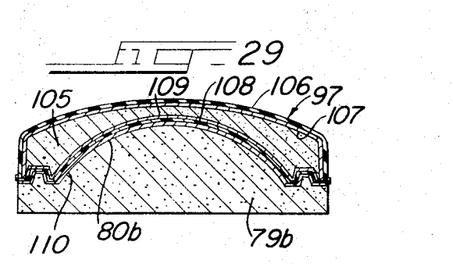
FIG. 29 is a transverse vertical sectional view illustrating the construction of the cover unit for the box or base portion of the vault illustrated in FIG. 28 and illustrating the method of making the cover unit.
Figure 30:
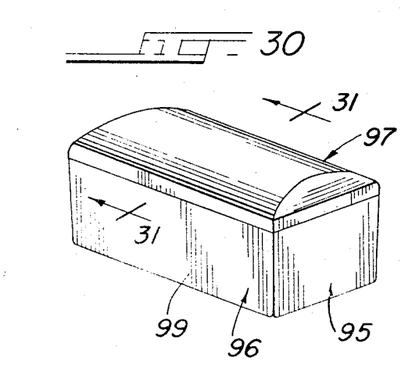
FIG. 30 is a perspective view illustrating the completed and assembled vault embodying the box or base portion illustrated in FIG. 28 and the cover unit illustrated in FIG. 29.
Figure 31:
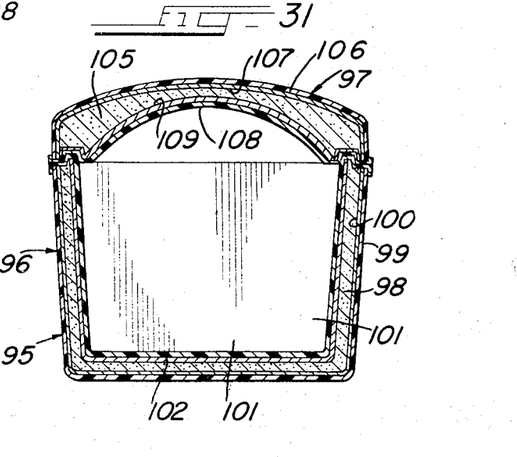
FIG. 31 is an enlarged transverse vertical sectional view on line 31—31 in FIG. 30.

The cover unit 97 for the burial vault 95 illustrated in FIGS. 27–31, inclusive, is illustrated in FIGS. 29, 30 and 31 of the drawings, and the method of making the cover unit 97 is illustrated in FIG. 29; those parts of the cover unit 97 and of the form or jig used in making it, which correspond to similar parts illustrated in FIG. 24, being given the same reference numerals followed by the additional and distinguishing reference character "b."

The cover unit 97 illustrated in FIGS. 29, 30 and 31 embodies a concrete inner liner or wall component 105 and an outer liner 106 which is adhesively bonded to the concrete inner wall component or liner 105 by an adhesive bonding coating 107.

The cover unit 97 also includes an inner finish liner coating 108 which is adhesively bonded to the inner concrete wall component or liner 105 by an adhesive bonding coating 109.

In making the cover unit 97 for the form of the new vault illustrated in FIGS. 27 to 31, inclusive, of the drawings, the convexly upwardly curved surface 80b of the form of jig 79b is first provided with a coating 110 of a suitable release agent such, for example, as petroleum wax (paraffin), or other suitable release agent material, following which the interior finish liner coating 108 of glass fiber reinforced polyester resin, or other suitable material, is applied as by spraying, brushing or the like, over the release coating 110, and upon drying it forms a continuous solidified coating. The adhesive inner bonding coating 109 is then applied over the glass fiber reinforced polyester resin or like inner finish liner coating 108, or other suitable material. The concrete inner wall component or liner 105 is then formed by applying a suitable concrete mix over the adhesive bonding coating 109 while the adhesive bonding coating 109 is still in a tacky condition, and suitably shaping the concrete mix, as by hand trowelling, or the like. The concrete mix is then allowed to set and harden whereupon the outer adhesive bonding coating 107 is then applied over the upper surface of the concrete wall component or liner 105. The outer liner coating 106 of glass fiber reinforced polyester resin, or other suitable material, is then applied over the adhesive bonding coating 107, while the latter is in a tacky condition, and upon drying the outer liner coating 106 forms a continuous solidified coating. In this manner the outer liner coating 106 of glass fiber reinforced polyester resin, or other suitable material, is integrally bonded by the dried or cured adhesive coating 107 to the concrete inner wall component or liner 105, and the inner finish liner coating 108 of glass fiber reinforced polyester resin, or other suitable material, is also integrally bonded by the cured adhesive bonding coating 109 to the concrete inner wall component or liner 105, thereby completing the cover unit 97 and the vault 95.

The thus completed box or base portion 96 and the cover unit 97 of the vault 95, may be assembled as shown in FIGS. 30 and 31, to complete this form of the invention.

When thus completed, the box or base portion 96 and the cover unit 97, of the new burial vault illustrated in FIGS. 27 to 31, inclusive, each embody an inner concrete wall component or liner with an inner finish liner coating and an outer liner coating having high structural, tensile and flexural strength, great resistance to water penetration and to the corrosive action of fluids to which the vault may be subjected in the grave opening, and other desirable advantages and characteristics herein described including the fact that both the inner finish liner coating and the outer finish linear coating may be made in a wide variety of colors to present a new and attractive appearance to the complete burial vault 95, shown in FIG. 30.

In forming the inner finish liner coating 88 of the box or base portion 83 and in forming the inner finish liner coating 93 of the cover unit 84 of the vault 82, shown in FIGS. 22 to 26, inclusive, and when forming the inner finish liner coating 101 and the outer finish liner coating 99 of the box or base portion 96, and when forming the inner finish liner coating 108 and the outer finish liner coating 106 of the cover unit 97 of the form of the new vault illustrated in FIG. 27 to 31, inclusive, as by spraying, brushing, or the like, various so-called spray-up materials may be employed including various air-drying latex emulsions, thermosetting epoxy resins such, for example, as Resiweld 7223 thermosetting epoxy resin (H. B. Fuller Company) which is preferably applied in three separate coatings each of approximately 0.010" wet film thickness, applied at four hour intervals, so as to allow each coating to partially dry or cure before new coating is applied so as to provide a liner which, when dry, is approximately 0.025" in thickness; thermosetting polyester resins with or without glass fiber reinforcing or rovings; acrylic lacquers, polyamide resins; and like materials.

In addition to the so-called spray-up materials referred to above; and which may be employed in making the inner and outer finish liner coatings for the base or box portions and for the cover units of the vaults illustrated in FIGS. 22 to 26, inclusive, and in FIGS. 27 to 31, inclusive, a cast-in-place liner may be formed by heating a suitable steel or like mold, such as the form or mold 89 (FIG. 22) which is coated with a parting agent, and then flowing thermoplastic powdered butadiene-polystyrene copolymer (such as Dow 453) against the hot surface with the result that the thermoplastic resin particles fuse together when striking the hot mold surface to form a continuous cast-in-place film or liner on the mold.

A liner for the box or base portion and for the cover units of the new burial vaults, such as illustrated in FIGS. 22 to 26, inclusive, and in FIGS. 27 to 31, inclusive, may also be formed by hot spraying a thermoplastic coating onto a suitable mold surface such, for example, as the outer surface of the steel or like mold 90 (FIG. 22). A typical example of a suitable thermoplastic resin which may be employed for this purpose is a modified polystyrene resin (HM–127–R, H. B. Fuller Company) which can be made liquid by heating to approximately 350° F. and then hot sprayed onto a cold metal surface, and when allowed to cool to room temperature it forms a tough rigid plastic liner.

Likewise, a composite or multiple coat or layer liner for the box or base portion and for the cover units of the new burial vaults, such as are illustrated in FIGS. 22 to 26, and in FIGS. 27 to 31, inclusive, may be made as follows:

(a) A pigmented polyvinyl acetate-latex coating may be applied in any suitable manner, as by spraying, brushing, or the like, to a suitable mold surface, such as the outer surface of the steel mold 90 (FIG. 22);

(b) A thermosetting epoxy resin or hot melt coating such, for example, as Resiweld 7223 (H. B. Fuller Company) thermosetting epoxy resin may then be applied, as by spraying, brushing, or the like, over the polyvinyl acetate-latex coating;

(c) An epoxy resin bonding adhesive coating is then applied over the thermosetting epoxy resin or hot melt coating; and (d) A concrete mix is then poured over and around the composite or multiple coat or layer liner thus formed while the epoxy resin bonding adhesive coating is still in a wet or tacky condition, and when the epoxy resin bond coating cures and the concerte mix sets and hardens the concrete wall component thus formed is integrally bonded by the epoxy resin bonding adhesive coating to the multiple layer or coat liner thus formed.

Figure 32:
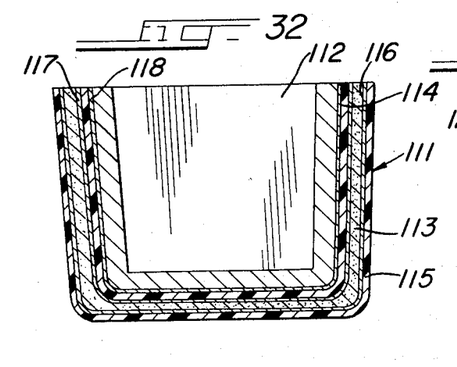
FIG. 32 is a transverse vertical sectional view illustrating the box or base portion of another form of the new composite wall burial vault.

The box or base portion of another form of the new composite wall burial vault is generally indicated at 111 in FIG. 32 of the drawings, and includes an inner concrete wall component or liner 112, an outer concrete wall component or liner 113, an inner plastic resinous molded or sprayed-up liner 114, and an outer plastic resinous molded or sprayed-up outer liner 115, which is adhesively and integrally bonded to the outer concrete wall or liner 113 by an adhesive bonding coating 116 of epoxy resin or other suitable bonding adhesive as hereinbefore described.

Similarly, the plastic resinous inner liner 114 is adhesively bonded on its outer side to the outer concrete wall 113 by an adhesive bonding coating 117 and the plastic resinous inner liner 114 is adhesively bonded on its inner side to the inner concrete wall component 112 by an adhesive bonding coating 118.

A cover unit (not shown) for the box or base portion 111 may be made of the same double concrete wall construction as is shown in FIG. 32.

Figure 33:
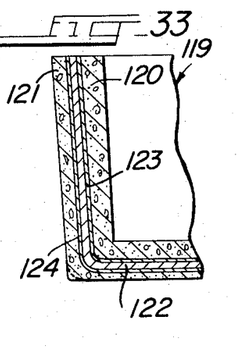
FIG. 33 is a fragmentary sectional view of the box or base portion of a burial vault illustrating another modification of the invention.

A further modification of the invention is illustrated in FIG. 33 of the drawings, wherein the box or base portion of one form of the new burial vault is generally indicated at 119 and comprises an inner concrete wall component 120 and an outer concrete wall component 121 with a molded synthetic plastic resinous inner liner component 122 which is integrally and adhesively bonded to the inner concrete wall component 120 by an adhesive bonding coating 123 and to the outer concrete wall component 121 by an adhesive bonding coating 123, as hereinbefore described.

Figure 34:
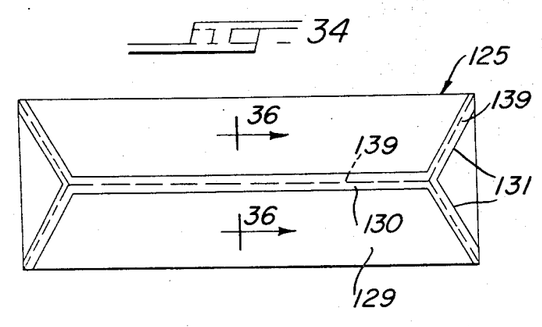
FIG. 34 is a side elevational view of the box or base portion of an other modification of the new composite wall burial vault.
Figure 35:
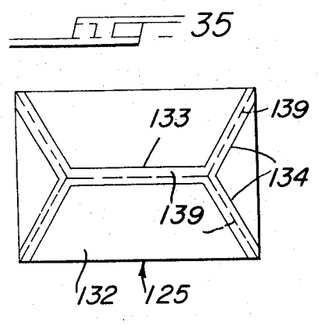
FIG. 35 is an end elevational view of the box or base portion of the burial vault illustrated in FIG. 34.
Figure 36:
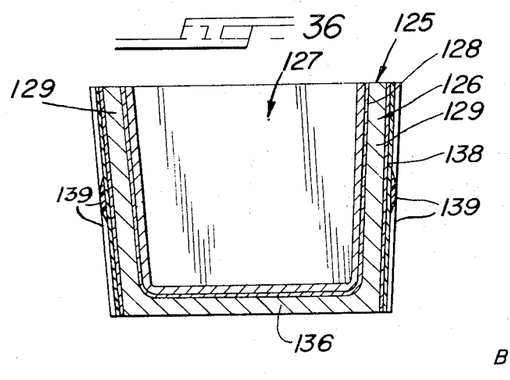
FIG. 36 is an enlarged transverse vertical sectional view on line 36—36 in FIG. 34.

An additional form of the invention is illustrated in FIGS. 34 to 36, inclusive, of the drawings, and the box or base portion of this form of the invention is indicated at 125, and includes a concrete side wall component 126 which includes side walls 129, end walls 132, and a bottom wall 136, and an inner plastic resinous liner 127 which may be in the form of a molded synthetic plastic resinous liner or in the form of a solidified coating formed by spraying, brushing or the like, of a coating of glass fiber reinforced polyester resin, or other suitable material and which is adhesively bonded to the inner surface of the concrete walls 129–132–136 by an epoxy resin or other suitable bonding adhesive coating 128 (FIG. 36).

In the form of the invention illustrated in FIGS. 34 to 36, inclusive, an adhesive bonding coating 137 is applied by spraying, brushing, or the like, over the entire outer surfaces of the concrete side walls 129, end walls 132 and bottom wall 136, and a coating 138 of glass fiber reinforced epoxy resin, or like material, is applied by spraying, brushing, or the like, over the adhesive bonding coating 137 while the latter is in a tacky condition, to provide an overall coating 138 which is preferably in the order of 10–20 mil in thickness.

In the form of the invention illustrated in FIGS. 34 to 36, inclusive, the areas of maximum stress to which the side walls 129 of the box or base portion of the burial vault 125 are subjected in a grave opening are indicated at 130 and 131 in FIGS. 34 and 36. Thus, it will be noted that these areas of maximum stress 130 extend longitudinally of the side walls 129, approximately midway between the top and bottom edges thereof, to points adjacent the ends of the side walls 132 and from there diagonally along areas 131 of maximum stress to the corners of the side walls (FIG. 34). To reinforce these areas 130–131 of maximum stress in the side walls 129 in the practice of the present invention, one or more coatings 139 of glass fiber reinforced polyester resin, epoxy resin, or the like, are applied by spraying, brushing or the like, over the areas of maximum stress 130–131 along the side walls 129 of the box or base portion 125 of the vault.

Similarly, there are comparable areas 133–134 of maximum stress in the end walls 132 of the box or base portion 125 of the vault as illustrated in FIG. 35, and these areas of maximum stress 133–134 in the end walls 132 of the box or base portion 125 are likewise reinforced by one or more coatings 139 of glass fiber reinforced polyester resin, epoxy resin, or other suitable reinforcing material applied as by spraying, brushing, or the like.

When the box or base portion 125 of the form of the burial vault illustrated in FIGS. 34, 35 and 36 of the drawings as interred in the grave opening, the maximum stress areas 130 and 131 in the side walls 129, and the areas of maximum stress 133–134 in the end walls 132 are reinforced by the greater thickness of the combined overall coating 138 and the additional reinforcing coating or coatings 139, thereby increasing the structural, tensile and flexural strength of the box or base portion 125 of this form of the new burial vault.

For use in bonding the lines to the concrete wall components of the box or base portion and of the cover units of the various forms of the new burial vaults hereinbefore described, various adhesive bonding agents, which will adhere to both plastic resinous liners and to wet concrete mixers may be employed.

Thus in the practice of the present invention, it has been found especially suitable to employ an epoxy resin as the wet, tacky adhesive bonding material.

Epoxy resin adhesive compositions which are suitable for use in the practice of the present invention are commercially available under the trademark Resiweld (H. B. Fuller Company), and a number of other proprietary names. It will be undestood that the particular choice of base polymer, polysulfide polymer, and accelerator or hardener, etc., for a particular epoxy resin adhesive composition, depends, in part, on the type of plastic resinous liner which is employed in making the new burial vaults and the resinous materials employed in making the same.

However, examples of typical and preferred epoxy resin adhesive compositions which have been found useful in the practice of the present invention are the following:

(a) For bonding wet concrete mixes to epoxy liners and to acrylonitrile-butadiene-styrene copolymer resin liners a modified epoxy adhesive bonding agent composition, sold under the trademark Resiweld No. 7650 F. (H. B. Fuller Company) is preferred. A description of this adhesive composition is published in Technical Bulletin No. RTB–30A of the H. B. Fuller Company, published February 1965;

(b) For bonding wet concrete mixes to polyester resin liners, epoxy liners and acrylonitrile-butadiene-styrene and high impact polystyrene (butadiene styrene) copolymer liners it is preferred to use the epoxy-polysulfide adhesive composition sold under the trademark Resiweld No. 7681 (H. B. Fuller Company). A description of this adhesive composition is published in H. B. Fuller Company Technical Bulletin No. RTB–25A, published February 1965. The formulation composition, compounding and essential characteristics of this adhesive composition, as set forth herein, and in the following Example No. 1, and in the following Tables Nos. 1 and 2, are described in detail in Federal Specification No. MMM–B–350a entitled "Binder, Adhesive, Epoxy Resin, Flexible," published June 2, 1964, susperseding U.S. Army Corps of Engineers Specification No. MMM–B–00350 (CE) published June 22, 1962.

A typical example of a procedure which may be followed in preparing a suitable adhesive composition for use in bonding the wet mix concrete component to a high impact polystyrene (butadiene-styrene) liner, or the other liners referred to herein, in making burial vaults in accordance with the practice of the present invention, namely, the aforesaid No. 7681 Resiweld adhesive composition (H. B. Fuller Company), is as follows:

EXAMPLE NO. 1

| | Parts by weight |
|---|---|
| (a) Epoxy base polymer-diglycidyl ether of bisphenol-A (essentially pure) (Shell Chemical Co. Epon 828, or Dow Chemical Co. DER 331) | 100.0 |
| (b) Polysulfide liquid polymer (flexibilizer)—(Dichloroethylformal polysulfide, in the 1000 molecular weight range) | 50.0 |
| (c) Accelerator or hardener: | |
| (1) 2,4,6 - tridimethylaminomethyl phenol (DMP–10, Rohm and Haas) | 3.75 |
| (2) dimethylaminomethyl phenol (DMP–30, Rohm and Haas) | 3.75 |

The materials referred to above are all intimately mixed together for a period of from three (3) to five (5) minutes, or until a homogeneous mixture is obtained, whereupon the resulting epoxy adhesive composition is ready for use. The epoxy adhesive composition thus prepared has a limited pot life of approximately one-half (½) hour at approximately 73.5° F. (plus or minum. 1.8° F.), and hence it is advisable to use the material promptly after it has been prepared, as above, so that as used it will possess its full bonding capability and be readily spreadable.

The characteristics of the base polymer, referred to in Part (a) of the foregoing Example No. 1, are set forth in the following Table No. 1:

TABLE NO. 1

| Property | Requirements | |
|---|---|---|
| | Minimum | Maximum |
| Color, Hellige | | 5 |
| Epoxide equivalent | 175 | 210 |
| Viscosity, poises at 25° C | 100 | 180 |
| Specific gravity at 25/25° C | 1.15 | 1.18 |

The characteristics of the polysulfide polymer, which is referred to in Part (b) of the foregoing Example No. 1, are set forth in the following Table No. 2, and are as follows:

TABLE NO. 2

| Property | Requirements | |
|---|---|---|
| | Minimum | Maximum |
| Color, Hellige | 9 | 12 |
| Water content, percent | | 0.1 |
| Specific gravity at 20/20° C | 1.24 | 1.30 |
| Viscosity, at 80° F., centipoises, Brookfield | 700 | 1,200 |
| pH of water extract | 6.0 | 8.0 |
| Flash point, ° F., Cleveland open cup | 390 | |
| Fire point, ° F., Cleveland open cup | 420 | |
| Sulfur content, percent | 36 | 40 |

The initial blended viscosity of the epoxy adhesive composition prepared in accordance with the foregoing Example No. 1 (Resiweld No. 7681, H. D. Fuller Company), is approximately 2500 centipoises at a room temperature of approximately 77° F.

It has been found in the practice of the present invention that the wet mix flowable concrete component, when carefully placed in accordance with the accepted concrete practices, does not displace or erode the wet tacky epoxy adhesive bonding composition prepared in accordance with the foregoing Example No. 1.

Likewise, it has been found that burial vaults made in accordance with the practice of the present invention embody composite wall structures having a compression strength of not substantially less than 4500 p.s.i. (pounds per square inch), and hence possess adequate compression strength to withstand the earth load in a grave opening and other stresses encountered in underground burial as discussed hereinbefore.

In the practice of the present invention, the epoxy adhesive composition and the wet mix flowable concrete component intermingle at their bonding surface or interface and cure, in situ, thereby forming with the plastic resinous liner component as integral composite wall construction having the high compression strength and other desirable characteristics and advantages herein described.

When the new composite burial vaults embodying the forms of constructions illustrated in FIGS. 1 to 36, inclusive, of the drawings, are thus made and completed, they provide highly desirable and satisfactory composite wall burial vaults, which have a number of desirable advantages and characteristics over prior burial vaults and among these are (a) they have high structural, tensile and flexural strength adequate to resist the overlying earth load and hydrostatic pressure when in the grave opening and to resist the crushing forces of earth handling machinery moved thereover in a cemetery; (b) they are highly water resistant and resistant to the corrosive action of water and other fluids to which such vaults are subjected in the grave opening; (c) the synthetic molded plastic resinous inner liners or wall components of the box or base portions and of the cover units are permanently and integrally bonded to the inner concrete liners or wall components thereof by the epoxy resin or like strong bonding adhesive coatings thereby forming a strong, integral durable composite wall construction of high compression strength which enables the thickness of the concrete wall components thereof to be reduced materially, relative to the thickness of the concrete walls of prior concrete vaults, with resulting reduction in weight and ease of handling of the vaults; (d) the synthetic plastic resinous wall components of the box or base portion and of the cover unit of the new composite burial vaults may be molded in any one of a large variety of colors in which synthetic plastic molding resins, suitable for use in making the composite burial vaults, are available, and which far exceeds the selection of colors which are available for use in spray coating or otherwise providing a decorative surface coating on concrete, or concrete-asphalt burial vaults to provide a decorative finish coating thereon, as has been customary heretofore in the art; (e) the synthetic molded plastic resinous wall components of the box or base portion and of the cover units of the vaults may be made in various sizes from so-called baby size vaults to adult size vaults and in relatively thin lightweight wall units, so that they may be transported from a central molding plant to the plants of burial vault manufacturers at various distant locations where the new composite burial vaults may be completed by forming the inner concrete wall components thereof without the necessity for or the use of expensive concrete or other molding or forming equipment by the individual vault manufacturer; and (f) in those forms of the invention illustrated particularly in FIGS. 22 to 36, inclusive, of the drawings, the synthetic plastic resinous inner liner, formed by spraying, or otherwise applying a synthetic plastic resinous coating upon a steel of like mold surface, when cured, provides a plastic resinous inner liner which has a smooth uninterrupted inner surface which is a mirror image of the mold and provides in the completed composite wall burial vault an attractive appearance while, at the same time, the vault possesses the desirable advantages and characteristics referred to hereinbefore.

It will thus be seen from the foregoing description, considered in conjunction with the accompanying drawings, that the present invention provides new and improved composite wall burial vaults and novel methods of making the same, and that the invention thus has the desirable advantages and characteristics and accomplishes its intended objects including those hereinbefore set forth and others which are inherent in the invention.

We claim:

1. The method of molding an integral composite wall burial vault comprising a hollow concrete box structure and a rigid plastic liner therefor having side, end and bottom walls and an open top, and a cover for the said open top, comprising the steps of:
    (a) molding a rigid self-sustaining plastic resinous hollow rectangular box-shaped liner having similar side walls, end walls and a bottom wall, each having an inner surface and an outer surface;
    (b) separately molding a rectangular-shaped plastic resinous cover liner for the said cover having a wall with an inner and outer surface.
    (c) applying a wet, tacky adhesive bonding coating which is curable to high strength on the entire outer surface of each of said plastic resinous liner and the cover liner;
    (d) maintaining the adhesive bonding coating in its wet, tacky state and applying a wet-mix flowable concrete component directly on the entire wet, tacky adhesive coating with the adhesive coating and the concrete component intermingled at their contacting adjacent surfaces of the liner and said separate cover liner; and
    (e) curing in situ the wet-mix concrete component and the adhesive bonding coating on each of the plastic resinous liner and the liner for the separate cover, effecting an integral bonding between the wet-mix concrete component and the resinous plastic liner and the liner for the separate cover, resulting in a composite box structure and cover therefor each having such high structural and flexural strength as to withstand the crushing weight of the overlying earth load and the hydrostatic pressure when the box with its cover is interred in a grave opening, and the additional weight of earth handling machinery moved thereover.

References Cited

UNITED STATES PATENTS

| | | | |
|---|---|---|---|
| 3,283,386 | 11/1966 | Cenegy | 52—309 |
| 3,130,520 | 4/1964 | Newman | 52—135 |
| 2,921,463 | 1/1960 | Goldfein | 264—228 |
| 2,964,800 | 12/1960 | Dorsett | 264—255 |
| 3,100,677 | 8/1963 | Frank | 264—71 |
| 2,816,323 | 12/1957 | Munger | 264—255 |
| 2,616,146 | 11/1952 | Haase | 264—255 |
| 2,749,266 | 6/1956 | Eldred | 264—157 X |

OTHER REFERENCES

"Journal of American Concrete Institute," Current Reviews, "Materials," Rooney & Botts, California Highways and Public Works, vol. 35, Nos. 9–10, September 1956, pp. 48–50.

Pitt; "Epoxy Resins," Modern Plastics Encyclopedia, 1962, p. 192.

ROBERT F. WHITE, Primary Examiner

T. P. PAVELKO, Assistant Examiner

U.S. Cl. X.R.

264—248, 250, 256, 261